(12) United States Patent
Wang et al.

(10) Patent No.: US 12,014,039 B2
(45) Date of Patent: Jun. 18, 2024

(54) INTERACTION TRACKING CONTROLS

(71) Applicant: Google LLC, Mountain View, CA (US)

(72) Inventors: Gang Wang, Jersey City, NJ (US); Nitish J. Korula, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/048,395

(22) PCT Filed: Jan. 24, 2020

(86) PCT No.: PCT/US2020/014901
§ 371 (c)(1),
(2) Date: Oct. 16, 2020

(87) PCT Pub. No.: WO2021/150236
PCT Pub. Date: Jul. 29, 2021

(65) Prior Publication Data
US 2023/0065501 A1 Mar. 2, 2023

(51) Int. Cl.
*G06F 3/0482* (2013.01)
*G06F 3/04847* (2022.01)

(52) U.S. Cl.
CPC ........ *G06F 3/04847* (2013.01); *G06F 3/0482* (2013.01)

(58) Field of Classification Search
CPC .......................... G06F 3/04847; G06F 3/0482
See application file for complete search history.

(56) References Cited

U.S. PATENT DOCUMENTS 6,327,574 B1 * 12/2001 Kramer ............. G06Q 30/0613
705/14.66
8,949,978 B1 * 2/2015 Lin ......................... G06F 21/51
726/25

(Continued)

FOREIGN PATENT DOCUMENTS

| CN | 103562928 | 2/2014 |
| CN | 106599298 | 4/2017 |
| WO | WO 2012160567 | 11/2012 |

OTHER PUBLICATIONS

Office Action in Japanese Appln No. 2020-560742, dated Apr. 4, 2022, 8 pages (with English translation).
Arulselvan et al., "A note on the set union knapsack problem," Discrete Appl. Math., May 2014, 214-218.
Bashir et al., "Diffusion of User Tracking Data in the Online Advertising Ecosystem," Proceedings on Privacy Enhancing Technologies, Oct. 2018, (4):85-103.

(Continued)

*Primary Examiner* — Phenuel S Salomon
(74) *Attorney, Agent, or Firm* — Fish & Richardson P.C.

(57) ABSTRACT

A browser executing on a client device can detect external calls to remote servers generated by an online document. The browser can detect, in external content received in response to the external calls and for presentation in the online document, metadata describing domains that contributed to the delivery of the external content to the client device. The browser can aggregate, for each of the domains, a contribution of the domain to enable the presentation of the external content with the online document over a specified time period. The browser can present a visual representation of the contribution of each of at least some of the domains. The browser can receive, in response to interaction with the visual representation, a selection of one or more domains among the at least some domains. The browser can prevent the one or more domains from receiving subsequent external calls from the browser.

17 Claims, 5 Drawing Sheets

(56) References Cited

U.S. PATENT DOCUMENTS

| | | | |
|---|---|---|---|
| 9,160,745 B1 | 10/2015 | Sullivan et al. | |
| 2003/0069803 A1* | 4/2003 | Pollitt | G06Q 30/0601 |
| | | | 705/26.1 |
| 2006/0064467 A1 | 3/2006 | Libby | |
| 2009/0300768 A1* | 12/2009 | Krishnamurthy | H04L 63/1483 |
| | | | 726/26 |
| 2010/0198834 A1* | 8/2010 | Petras | G06F 16/34 |
| | | | 707/E17.014 |
| 2011/0214163 A1 | 9/2011 | Smith et al. | |
| 2011/0302025 A1* | 12/2011 | Hsiao | G06Q 30/0242 |
| | | | 705/14.42 |
| 2012/0084331 A1* | 4/2012 | Van Ewijk | H04L 41/046 |
| | | | 707/812 |
| 2013/0005360 A1* | 1/2013 | Issa | H04H 20/61 |
| | | | 455/456.3 |
| 2013/0054801 A1* | 2/2013 | Belchee | G06F 21/105 |
| | | | 709/225 |
| 2013/0085894 A1* | 4/2013 | Chan | G06Q 30/02 |
| | | | 705/26.62 |
| 2015/0127634 A1 | 5/2015 | Hong | |
| 2016/0196432 A1* | 7/2016 | Main | H04W 12/08 |
| | | | 726/1 |
| 2016/0239569 A1 | 8/2016 | Levy | |
| 2016/0344828 A1* | 11/2016 | Häusler | G06F 16/9535 |
| 2018/0052851 A1* | 2/2018 | Lewis | H04N 21/4667 |
| 2018/0176612 A1 | 6/2018 | Neufeld et al. | |
| 2018/0293375 A1* | 10/2018 | Wang | G06F 21/53 |
| 2019/0238544 A1* | 8/2019 | Rajahram | H04L 63/101 |
| 2019/0238615 A1 | 8/2019 | Freedman et al. | |

OTHER PUBLICATIONS

PCT International Search Report and Written Opinion in International Appln. No. PCT/US2020/014901, dated May 27, 2020, 15 pages.

Wikipedia.com [online], "Integer Programming," retrieved on Nov. 3, 2020, retrieved from URL <https://en.wikipedia.org/wiki/Integer_programming>, 9 pages.

Wikipedia.com [online], "Separation of concerns," retrieved on Nov. 3, 2020, retrieved from URL <https://en.wikipedia.org/wiki/Separation_of_concerns>, 6 pages.

International Preliminary Report on Patentability in International Appln. No. PCT/US2020/014901, mailed on Aug. 4, 2022, 10 pages.

Office Action in Chinese Appln. No. 202080002568.0, dated Oct. 10, 2022, 14 pages (with English translation).

Office Action in European Appln. No. 20708749.5, dated Sep. 28, 2022, 7 pages.

Office Action in Indian Appln. No. 202027043497, dated Aug. 29, 2022, 7 pages (with English translation).

Office Action in Japanese Appln. No. 2020-560742, dated Aug. 8, 2022, 5 pages (with English translation).

Office Action in Korean Appln. No. 10-2020-7031302, dated Dec. 21, 2021, 13 pages (with English translation).

Office Action in Indian Appln. No. 202027043497, mailed on Sep. 12, 2023, 4 pages (with English translation).

Notice of Allowance in Chinese Appln. No. 202080002568.0, dated Apr. 2, 2023, 5 pages (with English translation).

* cited by examiner

INTERACTION TRACKING CONTROLS

CROSS-REFERENCE TO RELATED APPLICATION

This application is a National Stage Application under 35 U.S.C. § 371 and claims the benefit of International Application No. PCT/US2020/014901, filed Jan. 24, 2020. The disclosure of the foregoing application is hereby incorporated by reference in its entirety.

TECHNICAL FIELD

This specification relates to data processing and managing tracking of online interactions.

BACKGROUND

Network calls can be initiated by scripts executed when an online resource is rendered at a client device. For example, the online resource may include a pixel that triggers a network call to a remote server (e.g., an interaction tracking server, a third party content server, or another server).

SUMMARY

In one aspect, a browser executing on a client device can detect external calls to remote servers generated by an online document. The browser can detect, in external content received in response to the external calls and for presentation in the online document, domains that contributed to the delivery of the external content to the client device. For example, the domains that contributed to the delivery of the external content can be detected, or otherwise identified in metadata of the external content. The browser can aggregate, for each of the domains, a contribution of the domain to enable the presentation of the external content with the online document over a specified time period. The browser can present a visual representation of the contribution of each of at least some of the domains. The browser can receive, in response to interaction with the visual representation, a selection of one or more domains among the at least some domains. The browser can prevent the one or more domains from receiving subsequent external calls from the browser.

In some implementations, one or more of the following can be additionally implemented, either individually or in any suitable combination. The preventing of the one or more domains from receiving subsequent external calls from the browser can include preventing, by the browser, the one or more domains from receiving one or more cookies or other data that enables collection of user data by the one or more domains. The presenting of the visual representation can include: generating, by the browser, a recommendation that at least one of the at least some domains be allowed to continue tracking online interactions by way of the external calls; and displaying, by the browser, the recommendation within the visual representation. The contribution of each domain of the domains can be based on a total number of digital documents facilitated by the domain over the period of time. The digital documents can include a digital document associated with the external content. The aggregating of the contribution of the domain can include: determining each different type of external content presentation that was contributed to by the domain; assigning a level of contribution to the domain for each presentation of each different type of external content; and aggregating the assigned levels of contribution.

The assigning the level of contribution to the domain can include: assigning a first level of contribution to external content that is video content; and assigning a second level of contribution to external content that is still image content. In some implementations, the assigning of the level of contribution to the domain can include assigning the level of contribution based on a size of the external content presented. The level of contribution can vary according to the size of the external content. In certain implementations, assigning the level of contribution to the domain can include assigning the level of contribution based on a type of online interaction performed by a user following presentation of the external content.

The browser can provide the contribution of two or more of the domains to an application programming interface. The browser can receive, via the application programming interface, instructions from a resource provider of a resource rendered on the browser to prevent the one or more domains from tracking user interactions.

In another aspect, there is provided a non-transitory computer program product storing instructions that, when executed by a browser executing on a client device, cause the browser to perform operations comprising, detecting external calls to remote servers generated by an online document, detecting, in external content received in response to the external calls and for presentation in the online document, metadata describing domains that contributed to the delivery of the external content to the client device, aggregating, for each of the domains, a contribution of the domain to enable the presentation of the external content with the online document over a specified time period, presenting a visual representation of the contribution of each of at least some of the domains, receiving, in response to interaction with the visual representation, a selection of one or more domains among the at least some domains; and preventing the one or more domains from receiving subsequent external calls from the browser.

Preventing the one or more domains from receiving subsequent external calls from the browser may comprise preventing the one or more domains from receiving one or more cookies or other data that enables collection of user data by the one or more domains.

The presenting of the visual representation may comprise generating, by the browser, a recommendation that at least one of the at least some domains be allowed to continue tracking online interactions by way of the external calls, and displaying, by the browser, the recommendation within the visual representation.

The contribution of each domain of the domains may be based on a total number of digital documents facilitated by the domain over the period of time, the digital documents including a digital document associated with the external content.

Aggregating the contribution of the domain may comprise determining each different type of external content presentation that was contributed to by the domain, assigning a level of contribution to the domain for each presentation of each different type of external content, and aggregating the assigned levels of contribution.

Assigning the level of contribution to the domain may comprise assigning a first level of contribution to external content that is video content, and assigning a second level of contribution to external content that is still image content.

Assigning the level of contribution to the domain may comprise assigning the level of contribution based on a size of the external content presented, wherein the level of contribution varies according to the size of the external content.

Assigning the level of contribution to the domain may comprise assigning the level of contribution based on a type of online interaction performed by a user following presentation of the external content.

The operations may further comprise, providing, by the browser, the contribution of two or more of the domains to an application programming interface, and receiving, by the browser and via the application programming interface, instructions from a resource provider of a resource rendered on the browser to prevent the one or more domains from tracking user interactions.

In another aspect there is provided a system comprising one or more data processing devices and a machine-readable medium storing instructions that, when executed by the one or more data processing devices, cause the one or more data processing devices to perform operations comprising, detecting external calls to remote servers generated by an online document, detecting, in external content received in response to the external calls and for presentation in the online document, domains that contributed to the delivery of the external content to the client device, aggregating, for each of the domains, a contribution of the domain to enable the presentation of the external content with the online document over a specified time period, presenting a visual representation of the contribution of each of at least some of the domains, receiving, in response to interaction with the visual representation, a selection of one or more domains among the at least some domains, and preventing the one or more domains from receiving subsequent external calls from the browser.

In another aspect, a non-transitory computer program product can store instructions that, when executed by a browser executing on a client device, cause the browser to perform operations discussed above. In yet another aspect, a system is described that can include: a browser; and a machine-readable medium storing instructions that, when executed by the browser, cause the browser to perform operations noted above. Optional features of one aspect may be combined with any other aspect.

The subject matter described herein may provide various advantages. For example, techniques discussed throughout this document can reduce the number of network calls generated by a client device when a resource (e.g., online resource such as a webpage) is loaded by the client device. Reducing the number of network calls initiated by the client device can reduce the amount of time required to load the resource, extend the battery life of the client device (e.g., by reducing power consumption caused by excess network calls), eliminate errors that can be experienced by failed network calls, and improve a user's interactions with the resource. In some implementations, the number of network calls can be reduced by providing a user, and/or a provider of the resource, with controls that can disable network calls on a per-domain basis. For example, when a resource is loaded, the client device and/or a remote server, can detect the network calls that are triggered. Similarly, when content is returned to the client device in response to a network call, the domains that contributed to delivery of that content can also be detected by the browser or declared by the content provider. This information can be aggregated and provided to the user and/or the provider of the resource along with controls that enable the user and/or resource provider to disable calls to one or more of the domains specified in the collected information. That is, subject matter disclosed herein provides an improved user interface which enables the user or resource provider to disable network calls on a per-domain basis. After disabling a particular domain through interaction with the controls, the client device will not initiate network calls to that particular domain when the resource is subsequently rendered at the client device, thereby improving the rendering time for the resource, reducing network traffic generated by the client device, and reducing battery consumption.

In some implementations, the conveyance of tracking information via the network calls can be prevented by withholding cookies, or other data, that may have helped the recipient domain to track the user or collect user data. Withholding of such cookies or other data can reduce the amount of data communicated between the client device and the domains, thereby using lower bandwidth and achieving faster communication speed. In some implementations, the browser can allow the transmission of the network call to a recipient domain, but the browser can route the external call through a virtual private network (VPN) and/or an overlay network (e.g., Tor network) so as to conceal the location—e.g., internet protocol (IP) addresses—of the client device, thereby preventing the domain receiving the network call from tracking user interactions on the client device. Such implementation can advantageously enable secure transmission of user data.

In addition to the foregoing advantages, the techniques discussed in this document can also result in improved privacy controls. For example, reducing the number of network calls generated by the client device can reduce the number of domains that can track online interactions, thereby improving a user's ability to control access to their information. Providing such control to the user can advantageously enable the user to better control his or her privacy by limiting access to their online activity. Providing such control to a resource provider can advantageously enable such resource provider to limit presentation of content to the content that is most meaningful to users of the resource, thereby improving the user's experience and encouraging loyalty of those users with the resource and thus the resource provider.

The details of one or more variations of the subject matter described herein are set forth in the accompanying drawings and the description below. Other features and advantages of the subject matter described herein will be apparent from the description, the drawings, and the claims.

BRIEF DESCRIPTION OF DRAWINGS

Like reference symbols in the various drawings indicate like elements.

DETAILED DESCRIPTION

Figure 1:
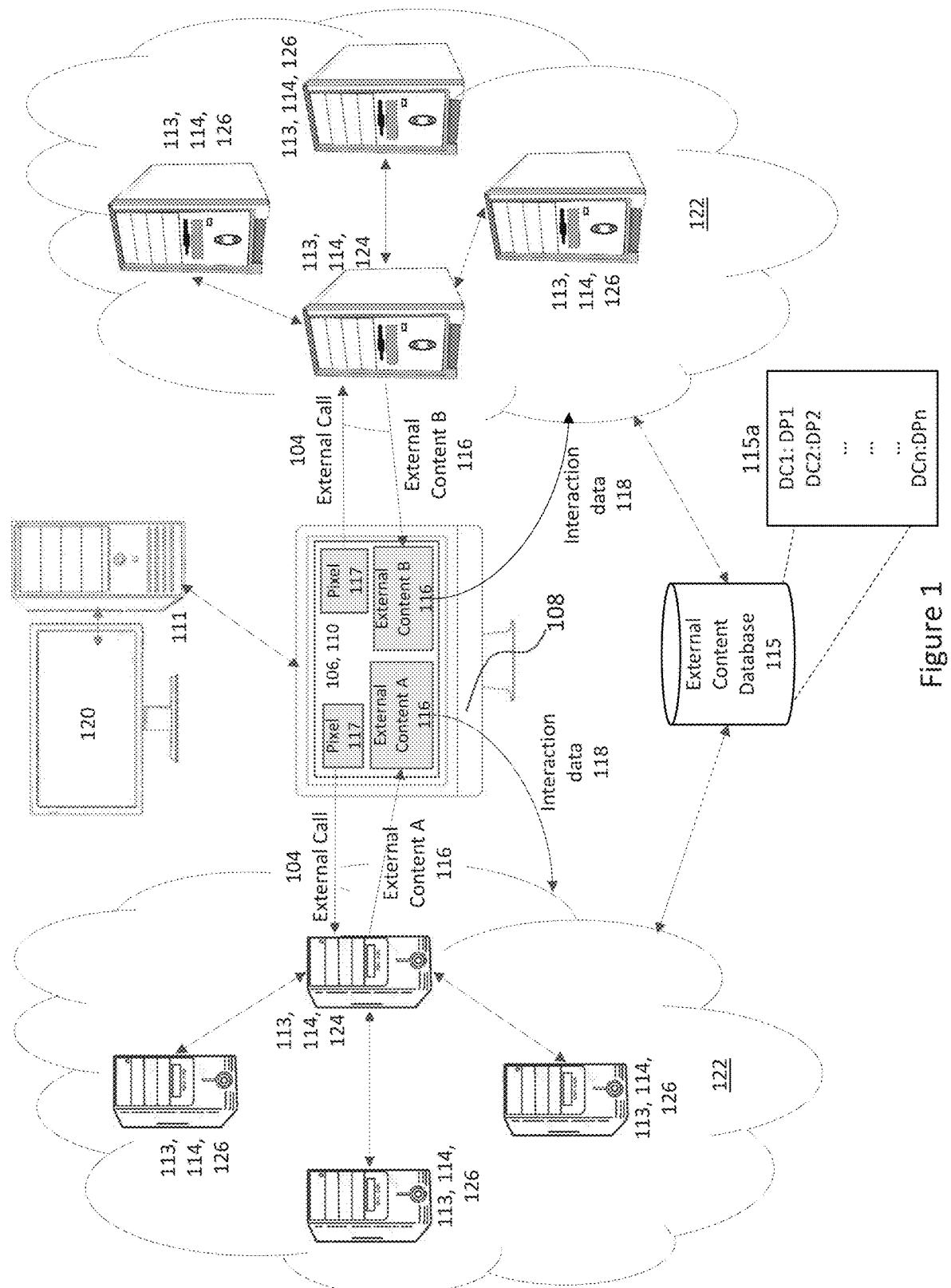
FIG. 1 illustrates a computing landscape for reducing the number of external calls.

FIG. 1 illustrates a computing landscape 102 for reducing the number of external calls (e.g., network calls) 104 initiated when a resource 106 (e.g., an online resource such as a webpage) is rendered by a client device 108. The resource 106 is rendered on a software application such as a browser (e.g., web browser) 110. While the description herein is focused on the software application being a browser, in other implementations the software application can be a native application.

The resource 106 is rendered on the client device 108, as shown in FIG. 1. The browser 110 can render and display the resource 106 provided by a server 111. In a specific example, the client device 108, by way of the browser 110, can transmit a request for a resource 106 to the server 111. Responsive to the request, the server 111 can transmit, to the client device 108, machine executable instructions that initiate presentation of the given resource 106 on the client device 108. Upon receipt of the instructions, the browser 110 can render and present the resource 106 in a display of the client device 108. While machine executable instructions are described for purposes of example, the operations described in this specification can be triggered by other data, such as an image file (e.g., JPEG file), and/or hidden keywords (e.g., HTML tags) that define how the browser 110 must format and display the content.

When the resource 106 is being rendered, the resource 106 can generate external calls 104 to remote servers 114 of domains 113. A domain 113 can be a domain host, which can be a computer hosting a corresponding domain name, such as the domain names A, B, C and D shown in FIGS. 2 and 3. Such computer can include at least one remote server 114. In some implementations, such computer (i.e., the domain 113) and the remote computer 113 can be the same, as shown in FIG. 1.

In some implementations, the external calls 104 can specify network addresses of specific remote servers 114 from which to fetch external content 116. The external calls 104 can include, for example, a request for external content 116—such as a digital component (e.g., audio clip, video clip, image, or text in any form including the form of an advertisement)—and metadata for that external content 116. Such request can be a packetized data request, which can include a header and payload data. The header of the packetized data request can include event data specifying identification features—such as a name and/or network location—of (a) a server 114 from which the digital component is being requested, and/or (b) the requesting device (e.g., the client device 108). The payload of the packetized request can include data (e.g., distribution parameters (DPs)) that the server 114 can use to select one or more digital components (DCs) from an external content database 115, which can include a mapping 115*a* between digital components (e.g., DC1, DC2, DC3, . . . DCn) and distribution parameters (e.g., DP1, DP2, DP3, . . . DPn).

In certain implementations, one or more distribution parameters (e.g., DPn) for a particular digital component (e.g., DCn) can include distribution keywords that must be matched (e.g., by electronic documents, document keywords, or terms specified in the external call 104) in order for the digital component (e.g., DCn) to be eligible for presentation. The distribution parameters (e.g., DP1, DP2, DP3, . . . DPn) can also require that the external call 104 include data specifying a particular geographic region (e.g., country or state) and/or data specifying that the external call 104 originated at a particular type of client device (e.g., mobile phone or tablet computer) in order for the digital component (e.g., DCn) to be eligible for presentation. The distribution parameters (e.g., DP1, DP2, DP3, . . . DPn) can also specify an eligibility value (e.g., ranking score or some other specified value) that is used for evaluating the eligibility of the digital component for distribution/transmission (e.g., among other available digital components). In some implementations, the eligibility value can specify an amount (e.g., maximum bid) that will be submitted when a specific event is attributed to the digital component (e.g., when an application is installed at a client device through interaction with the digital component or otherwise attributable to presentation of the digital component).

In some implementations, each domain 113 may provide data useful in the selection of the external content 116 by the server 114 that is processing and/or responding to the external calls 104. For example, one domain 113 may provide contextual data related to the resource 106, which can be useful in selecting the external content 116, and another domain 113 may provide profile information related to the user of the client device 108. In this example, each of these two domains 113 have contributed to delivery of the external content 116 that is provided in response to the external call 104 by providing data used to select the external content 116. Each domain 113 that contributed to the delivery of the external content can be included in metadata that is provided with (e.g., appended to) the external content 116 provided in response to the external calls 104.

The resource 106 can generate external calls 104 by, for example, firing of one or more pixels 117 that are embedded in the resource 106. In some implementations, a pixel 117 can be defined as a 1×1 invisible pixel that specifies the network location of the remote server 114 that is to be contacted (e.g., by way of an external call 104) when the resource 106 is rendered. For example, upon executing the pixel 117, the browser 110 can generate a HyperText Transfer Protocol (HTTP) request and transmit that request to the network address specified in the pixel 117. The HTTP request can include various information, such as an identifier of the client device 108, a reference to the resource 106 that is being rendered by the browser 110 and/or other contextual data related to the presentation of the resource 106.

In some implementations, the external calls 104 to remote servers 114 can occur in response to execution of a script within the resource 106 that causes the client device 108 to transmit a request to the one or more remote servers 114 to provide external content 116.

Some remote servers 114 may only process the external calls 104. For example, the external call 104 may include interaction data 118 (e.g., data specifying browsing history and/or user interaction with a user interface element, portion of content, or some other element, which can be audible or visual), and some remote servers 114 may only receive and process such interaction data. Other remote servers 114 can respond to the external calls 104 by, for example, selecting external content 116 in response to such external calls 104, and transmitting the external content 116 to the client device 108. The remote servers 114 can select the external content 116 from the external content database 115. The external content 116 can be, for example, a digital component (e.g., audio clip, video clip, image, or text in any form including the form of an advertisement). The remote servers 114 can attach (e.g., append) metadata for that external content 116 to that external content 116. The metadata can indicate one or more specific domains 113 that contributed to the delivery of the external content 116. For example, the metadata can indicate that a first domain 113 contributed certain graphics in the external content 116, and a second domain 113 contributed text in the external content 116. The resource 106 can display, among other things, the external content 116 in a predetermined space on the resource 106. In some situations, the first domain may collect user browsing history across multiple websites, and then infer the user's interest(s) based on that browsing history. The inferred interest(s) can then be used by a remote server to select the appropriate external content 116.

Once the external content 116 is presented at the client device 108, user interaction with the external content 116 can trigger one or more additional external calls 104 to servers 114 that track interactions—e.g., by way of interaction data 118—with the external content 116. Further external calls 104 can also be generated to report various client-side activity (e.g., performance of specific actions and/or visiting specific web pages) to various other servers.

The browser 110 can detect external calls 104 that are generated by the resource 106 and made to the remote servers 114. The browser 110 can extract metadata embedded in the external content 116 received in response to the external calls 104 to detect domains 113 that contributed to the delivery of the external content 116 to the client device 108. The browser 110, or a script/application in communication with the browser 110, can aggregate, for each of the domains 113 that contributed to the delivery of the external content 116 to the client device 108. The browser 110 can also determine a level of contribution of each of the domains 113 to presentation of external content 116 with the resource 106 over a specified time period. In one implementation, such time period may be a fixed time period, such as 2 hours, 12 hours, 1 day, 2 days, 5 days, 1 month, and/or any other time period. In another implementation, the time period may be configured to be modified on the client device 108 by a user. In yet another implementation, the time period can be based on historical data indicative of an average time duration it has taken to collect statistically relevant data.

The level of contribution for each particular domain 113 can be determined in one or more of the following ways. In some implementations, the contribution of each domain 113 can be based on a quantity of external content 116, to which is attached (e.g., appended) corresponding metadata identifying that domain 113 as contributing to the delivery of that external content 116 during the specified time period. In a specific implementation, the contribution of each domain 113 can be based on a total number of digital components (e.g., audio clips, video clips, images, or text in any form including the form of advertisements) where the metadata attached to those digital components identifies that domain 113 as contributing to the delivery of those digital components during the specified time period. In one example, the contribution of each domain 113 can be a total number of digital components that included metadata identifying that domain 113 as contributing to the delivery of digital components during the specified time period. For instance, if each digital component of a total of 40 digital components has metadata that identifies a domain 113 with domain name "A" as contributing to that digital component, then the contribution of that domain 113 with domain name "A" is 40.

In another example, the contribution of each domain 113 can be a function of (e.g., square of, cube of, square root of, an exponential function of, and/or any other mathematical function of) total number of digital components that included metadata identifying that domain 113 as contributing to the delivery of digital components during the specified time period. For instance, if each digital component of a total of 40 digital components has metadata that identifies a domain 113 with domain name "A" as contributing to that digital component, then the contribution of that domain 113 with domain name "A" can be a mathematical square of 40—i.e. 1600.

In yet another example, if the metadata lists a particular number (e.g., "N", where N can be any integer value) of domains 113 that contributed to the external content in which the metadata is embedded, each of those domains 113 gets 1/N credit from the specific external content. The browser 110 can then aggregate across all external content 116 shown over some period of time (e.g., 15 minutes, 30 minutes, 1 hour, 6 hours, 12 hours, 1 day, 2 days, 5 days, 15 days, 1 month, 3 months, 6 months, and/or any other time period, including time periods forming patterns of different time periods over which aggregation of external content 116 occurs) to calculate the total contribution of each of those domain 113.

In some other implementations, the contribution can be based on a percentage of the external content 116 (e.g., digital components) that were interacted with on the client device 108 following delivery to the client device 108. For example, if a domain 113 with domain name "A" transmitted 100 digital components for display on various resources (which can include the resource 106) displayed on the browser 110, and the browser 110 identified user interactions with 32 of those 100 digital documents, the contribution can be 32. In another example, the contribution can be a mathematical function that involves such percentage (e.g., a mathematical function involving the value 32, as specific to the example above). More particularly, such mathematical function can have a variable that has a value equal to such percentage.

In some implementations, the contribution of a domain 113 can be based on types of external content 116 (e.g., digital components) that were contributed by the domain 113. For example, a domain 113 can be allocated a sub-contribution for each presentation of each different type of external content 116. For example, a domain 113 with domain name "A" can be allocated (a) a sub-contribution C1 for a video digital content rendered by that domain 113 on the resource 106, (b) a sub-contribution C2 for an image digital content rendered by that domain 113 on the resource 106, and (c) a sub-contribution C3 for a textual digital content rendered on the resource 106. In this example, the total contribution of the domain can be: {(number of times the video digital content is rendered*C1)+(number of times the image digital content is rendered*C2)+(number of times the textual digital content is rendered*C3)}. The sub-contribution C1 for the video external content 116 (e.g., video digital document) can be more than the sub-contribution C2 for image external content 116 (e.g., image digital document). The sub-contribution C2 for the image external content 116 (e.g., image digital document) can be more than the sub-contribution C3 for the textual external content 116 (e.g., textual digital document).

The client device 108 can display a visual representation—examples of which are described in further detail below with respect to FIGS. 2 and 3—that displays: (a) names of at least some (e.g., all) domains 113 to which the resource 106 generates external calls 116, (b) a contribution of each domain 113, and (c) an option for the user to prevent generation (by the resource 106) and/or transmission (to the domain 113) of subsequent external calls 104. The visual representation can be a table, a graph, a spreadsheet, any other visual representation, and/or any combination thereof. In some implementations, the visual representation can display a recommendation of whether the user should prevent generation (by the resource 106) and/or transmission (to the domain 113) of subsequent external calls 104, as shown in FIG. 3. In further implementations, the visual representation can display a reason for such recommendation.

In some implementations, the browser 110 can expose the computed contributions of the domains 113 to an application programming interface (API) instead of, or in addition to, generating the visual representation. A resource provider of the resource 106 can instruct the browser 110 through the API to allow (a) at most a preset number of (e.g., "N" where N can be any integer) domains 113 with the most contributions, and/or (b) the least number of domains 113 to continue receiving calls in order to preserve a preset amount (e.g., 99%, 80%, 75%, or the like that may be more than 50%) of the external content 116. Each of the approaches (a) and (b) provides a minimal (or minimum) amount of data to servers other than the resource provider to track user's online behavior.

While the visual representation is described above as being displayed on the client device 108 across multiple resources 106 rendered by the same browser 110 during a specified period, in alternate implementations, the visual representation can be presented on a display device 120 to a resource provider of the resource 106, after the contribution of various domains 113 to resources 106 provided by server 111 across multiple devices 108 are aggregated properly to protect user privacy. The resource provider can be a publisher of the resource 106. In these implementations, the visual representation can display: (a) names of at least some (e.g., all) domains 113 to which the resource 106 generates external calls 116, (b) a contribution of each domain 113, and (c) an option for the resource provider to prevent generation (by the resource 106) and/or transmission (to the domain 113) of subsequent external calls 104. In some implementations, the visual representation can display a recommendation of whether the resource provider should prevent generation (by the resource 106) and/or transmission (to the domain 113) of subsequent external calls 104. In further implementations, the visual representation can display a reason for such recommendation.

In other implementations, the visual representation may be presented on both the client device 108 and the display device 120 so that any one of the user and the resource provider can prevent generation (by the resource 106) and/or transmission (to a domain 113) of subsequent external calls 104.

The recommendations within the visual representation can indicate domains 113 that may not be contributing enough to justify allocating computing resources to generating external calls to those domains 113. More particularly, the recommendations can be based on the contribution of each domain 113. For example, if the contribution of a particular domain 113 is low (e.g., lower than a threshold value), the visual recommendation may suggest that external calls 104 to that particular domain 113 be prevented. In some implementations, the recommendation that external calls to the particular domain 113 be blocked can be made based, at least in part, on that particular domain 113 contributing to delivery of digital components that have less than a specified level of user interaction and/or that fail to result in a specified level of user activity (e.g., less than a specified conversion rate) following interaction with the digital components.

The browser 110 can receive, in response to an interaction—e.g., by the user and/or the resource provider of the resource 106, depending on the implementation—with the visual representation, a selection of one or more domains 113 that should cause the browser 110 to prevent generation (by the resource 106) and/or transmission (to those one or more domains 113) of subsequent external calls 104. In some implementations, the browser 110 can transmit the selection to a remote server 114 that can link the selection with an account of the user or the resource provider. The resource 106 can retrieve the selection every time the user or resource provider inputs authentication data such as log-in data, thereby providing cross-device capability. The authentication data can include a username and a password, biometric data, security data obtained from an external device (e.g., security data embedded on a security key fob, one time password obtained from an email or a software application, or the like), any other authentication data, and/or any combination thereof. To prevent the one or more selected domains 113 from tracking online interactions, the browser 110 can prevent the generation (by the resource 106) and/or transmission (to one or more selected domains 113) of external calls 104.

In some implementations, the browser 110 can allow the transmission of the network call to a recipient domain 113, but may withhold one or more cookies, or other data, that may have helped the recipient domain 113 to track the user or collect user data. In some implementations, the browser 110 can allow the transmission of the network call to a recipient domain 113, but the browser 110 can route the external call through a virtual private network (VPN) and/or an overlay network (e.g., Tor network) so as to conceal the location—e.g., internet protocol (IP) addresses—of the client device 108, thereby preventing the domain 113 receiving the network call from tracking user interactions on the client device 108. In implementations where both the VPN network and the overlay network are used, the data characterizing the network calls can go through the VPN before going through the overlay network, and possibly through the overlay network before going through the VPN.

The resource 106 can be an online resource, such as an online document. Such online document can be a webpage. In some implementations, the resource 106 can be a word processing document, a portable document format (PDF) document, an image, a video, a search results page, a feed source, any other online document, and/or any combination thereof.

The client device 108 can be a laptop computer, a desktop computer, a tablet computer, a phablet computer, a phone, a kiosk computer, any other computing device, and/or any combination thereof. The client device 108 can be configured to be used by a user, for example, by inputting authentication data such as a username and a password, biometric data, security data obtained from an external device (e.g., security data embedded on a security key fob, one time password obtained from an email or a software application connected to the client device 108, or the like), any other authentication data, and/or any combination thereof.

The browser 110 can be a web browser, which is a software application for accessing data on a network, such as the World Wide Web. When a user inputs a web address for a particular resource 106 on the client device 108, the browser 110 can retrieve the resource 106 from the server 111 of a resource provider that provides the resource 106.

The server 111 can be a system that has at least one programmable processor, and a machine-readable medium storing instructions that, when executed by the at least one processor, cause the at least one programmable processor to perform various operations such as generating the resource 106, transmitting the resource 106 to the computing device 108 via a communication network, and in some implementations displaying the visual representation to the resource provider on the display device 120. In some implementations, the server 111 can be a laptop computer, a desktop computer, a tablet computer, a phablet computer, a phone, a kiosk computer, any other computing device, and/or any combination thereof. The server 111 can be connected to the client device 108 via a wireless connection over a local area network, a wide area network, internet, intranet, Bluetooth network, infrared network, any other one or more networks, and/or any combination thereof.

The remote servers 114 can be present in clusters 122. In some implementations, each cluster 122 can have a primary server 124, and secondary servers 126 communicatively coupled to the primary servers 124. In these implementations, the primary server 124 may be the only server 114 in the cluster 122 that is configured to communicate directly with (e.g., receive external calls 104 from, and transmit external content 116 to) the client device 108, and the secondary servers 126 may aid the primary server 124 in selecting external content 116. In certain implementations, each server 114 within a cluster 122 can be communicatively coupled with every other server 114 in that cluster 122.

Each remote server 114 can be a laptop computer, a desktop computer, a tablet computer, a phablet computer, a phone, a kiosk computer, any other computing device, and/or any combination thereof. At least one of the remote servers 114 can be a cloud computing server. In one example, all of the remote servers 114 can be cloud computing servers. The remote servers 114 and the client device 108 can be connected via a communication network, which can be the Internet. In alternate implementations, the remote servers 114 and the browser 110 can be connected via other communication networks such as a local area network, a wide area network, internet, intranet, Bluetooth network, infrared network, any other one or more networks, and/or any combination thereof.

The external content database 115 can be a memory device, such as a computer-readable storage device, a computer-readable storage substrate, a random or serial access memory array or device, any other one or more storage devices, and/or any combination thereof.

As used herein, the phrase "digital component" refers to a discrete unit of digital content or digital data (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising data, such that an advertisement is a type of digital component.

Figure 2:
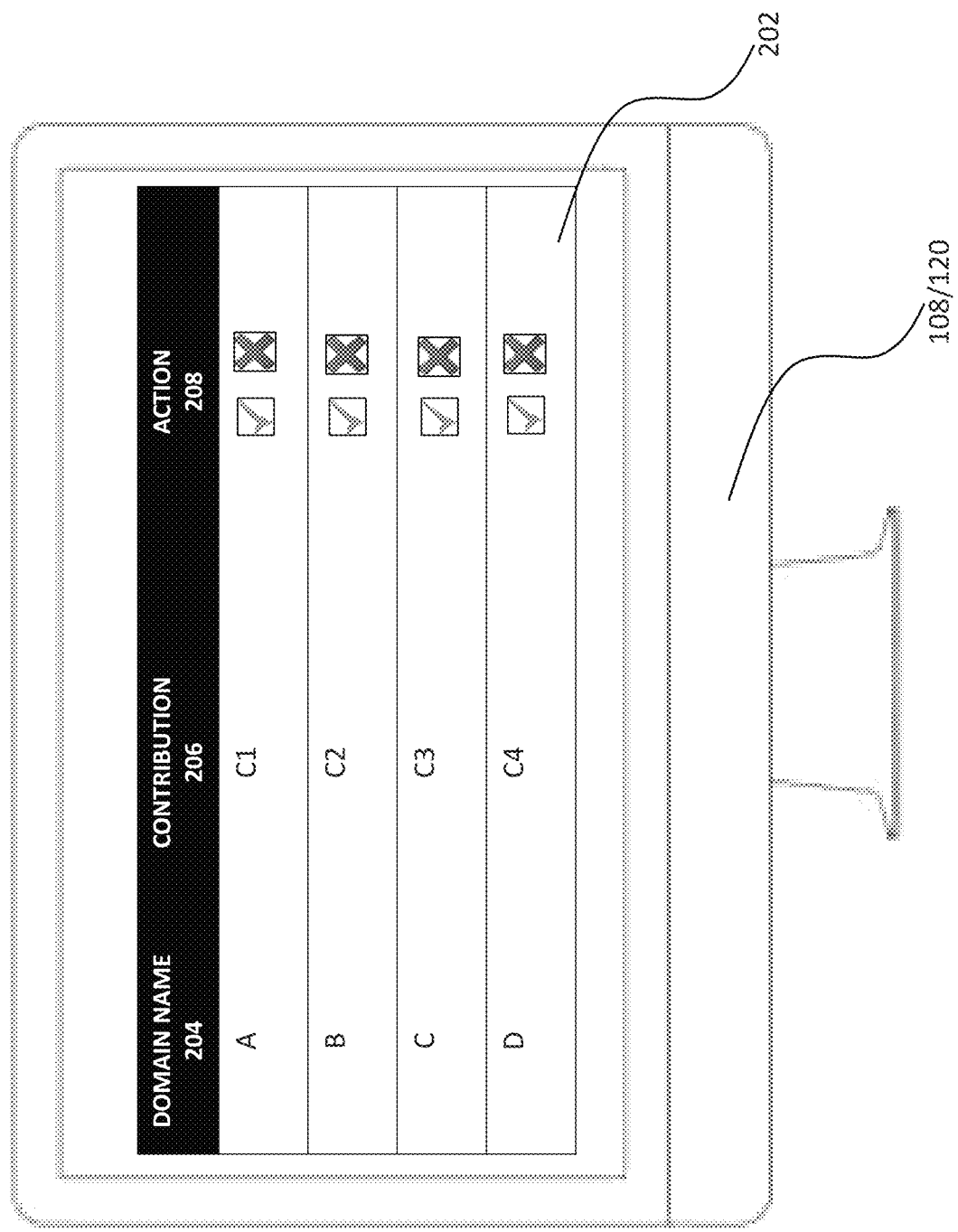
FIG. 2 illustrates a visual representation showing names of at least some domains to which the resource generates external calls.
Figure 3:
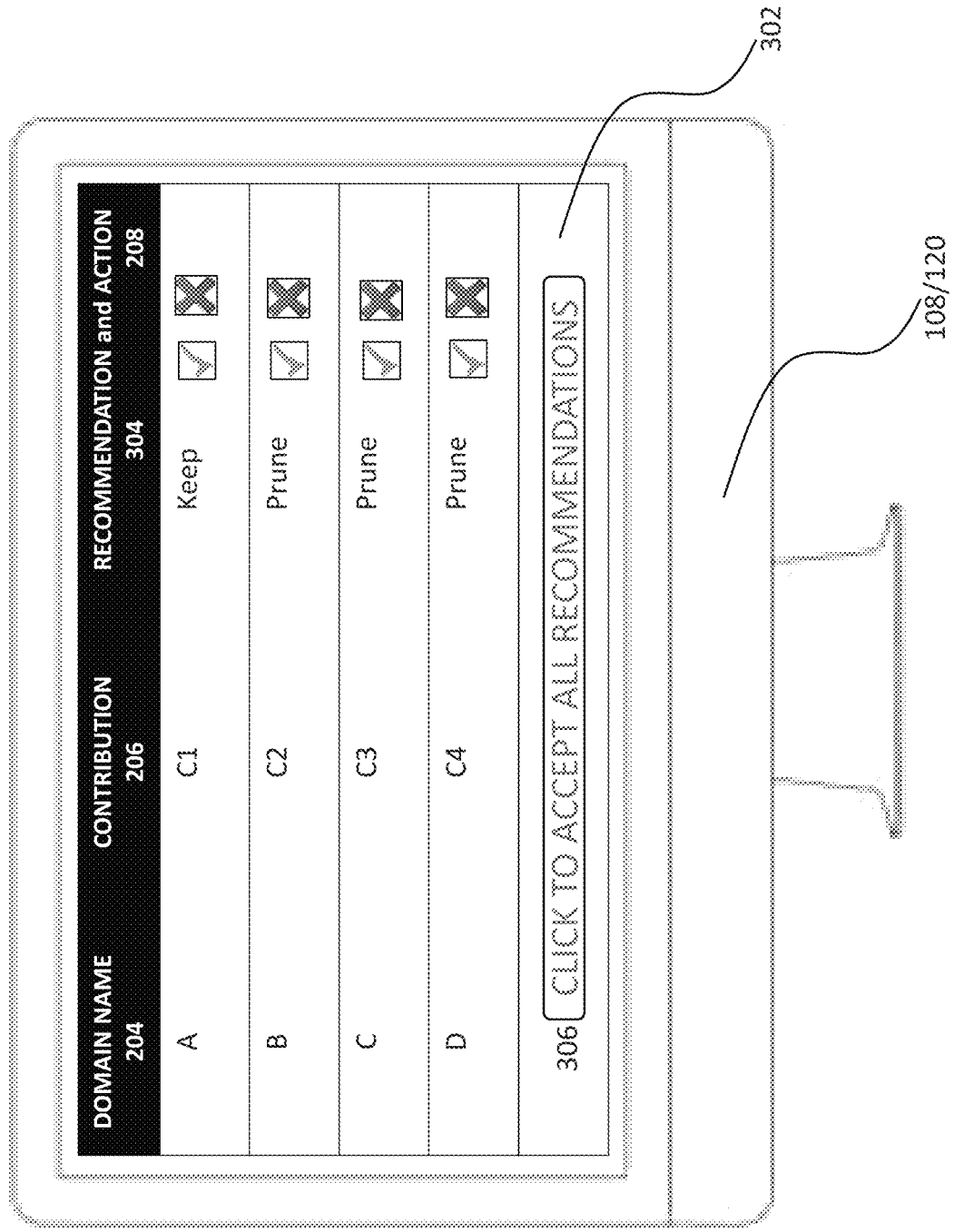
FIG. 3 illustrates a visual representation that displays a recommendation for each of the shown domains.

FIG. 2 illustrates a visual representation 202 of a user interface showing (a) names 204 of at least some (e.g., all) domains 113 to which some resource 106 shown in the browser 110 during the study/observation period generates external calls 116, (b) a contribution 206 of each of those shown domain names 113, and (c) an option for an action 208 to cause the browser 110 to prevent generation (by the resource 106) and/or transmission (to the corresponding domain 113) of subsequent external calls 104. The option for the action 208 can include an option (as shown by the cross symbol) to cause, when such option/symbol is selected, the browser 110 to prevent generation (by the resource 106) and/or transmission (to the domain 113) of subsequent external calls 104. The option for the action 208 can optionally include another option (as shown by the checkmark symbol) to allow, when such option/symbol is selected, the resource 106 to continue to initiate external calls 104 to the domain 113. Furthermore, the browser 110 can set the default value for those actions based on contribution 206, e.g. set the option to be "selected" as default for the domains 113 that are amongst the top N largest contributors and set the option to be "unselected" as default for the rest of the domains 113.

The number of domain names 204 shown in the visual representation 202 can be a preset number (e.g., two, three, five, ten, fifteen, or any other integer value) of domains 113 that have contributed the least (i.e., have had lowest contributions 206) among all of the contributing domains 113. In the example shown in FIG. 2, the number of domain names 204 are 4 (i.e., A, B, C and D), and those can be domain names for domains 113 that have contributed the least (i.e., have had lowest contributions 206; in FIG. 2, the domains 113 with domain names A, B, C and D may thus have the 4 lowest contributions 206) among all of the contributing domains 113.

In some implementations, the number of domain names 204 shown in the visual representation 202 can be a preset number (e.g., two, three, five, ten, fifteen, or any other integer value) of domains 113 that have contributed the most (i.e., have had highest contributions 206) among all of the contributing domains 113. In the example shown in FIG. 2, the number of domain names 204 are 4 (i.e., A, B, C and D), and those can be domain names for domains 113 that have contributed the most (i.e., have had highest contributions 206; in FIG. 2, the domains 113 with domain names A, B, C and D may thus have the 4 highest contributions 206) among all of the contributing domains 113.

In some implementations, the number of domain names 204 shown in the visual representation 202 can be a preset number of domains 113 that have contributed the most (i.e., have had highest contributions 206) and another preset number of domains 113 that have contributed the least (i.e., have had lowest contributions 206). In an example consistent with these implementations, the domains 113 with domain names A and B may have contributed the most, and the domains 113 with domain names C D) may have contributed the least, amongst all of the contributing domains 113 that have been detected irrespective of the level of contribution. The contributions 206 can be determined as discussed above.

FIG. 3 illustrates a visual representation 302 of a user interface that, in addition to the details in the visual representation 202 of FIG. 2, displays a recommendation 304 of whether to prevent the generation (by the resource 106) and/or transmission (to a domain 113 having a shown domain name 206) of subsequent external calls 104. The recommendation 304 can be based on a comparison of the contribution 206 and a threshold value. If the contribution 206 is equal to or greater than the threshold value, the resource 106 can generate a recommendation 304 "keep" to allow the resource 106 to continue to initiate external calls 104 to the domain 113. If the contribution 206 is lower (i.e., smaller) than the threshold value, the resource 106 can generate a recommendation 304 ("prune") to cause the resource 106 to prevent generation and/or transmission—to the domain 113 associated with corresponding domain name 204—of subsequent external calls 104, thereby recommending "pruning" such domain 113.

The visual representation 302 can further include a button 306, which when clicked, can cause the browser 110 to accept all recommendations 304.

In one variation, the visual representation 302 can include another column that shows a reason for the recommendation 304. The reason for the "keep" recommendation 304 can be that the contribution (e.g., C1) is above a threshold value. The reason for the "prune" recommendation 304 can be that the contribution (e.g., C2, C3 or C4, as relevant) is below a threshold value. In one example consistent with this variation, the threshold value can be 50% of external content 116 provided by the domain 113 associated with the corresponding domain name 206 involving user interaction; the contribution C1 can have a corresponding percentage of 73%; the contribution C2 can have a corresponding percentage of 24%; the contribution C3 can have a corresponding percentage of 8%; and the contribution C4 can have a corresponding percentage of 49.2%. The browser 110 can automatically generate such reason based on the contribution 206. For example, the reason can be a standard sentence (e.g., sentence "[Contribution X] of external content involved user interaction" where "[Contribution X]" is to be replaced with a value of the corresponding contribution, such as C1's value of 73%, as noted above, for the top row corresponding to domain name A).

Figure 4:
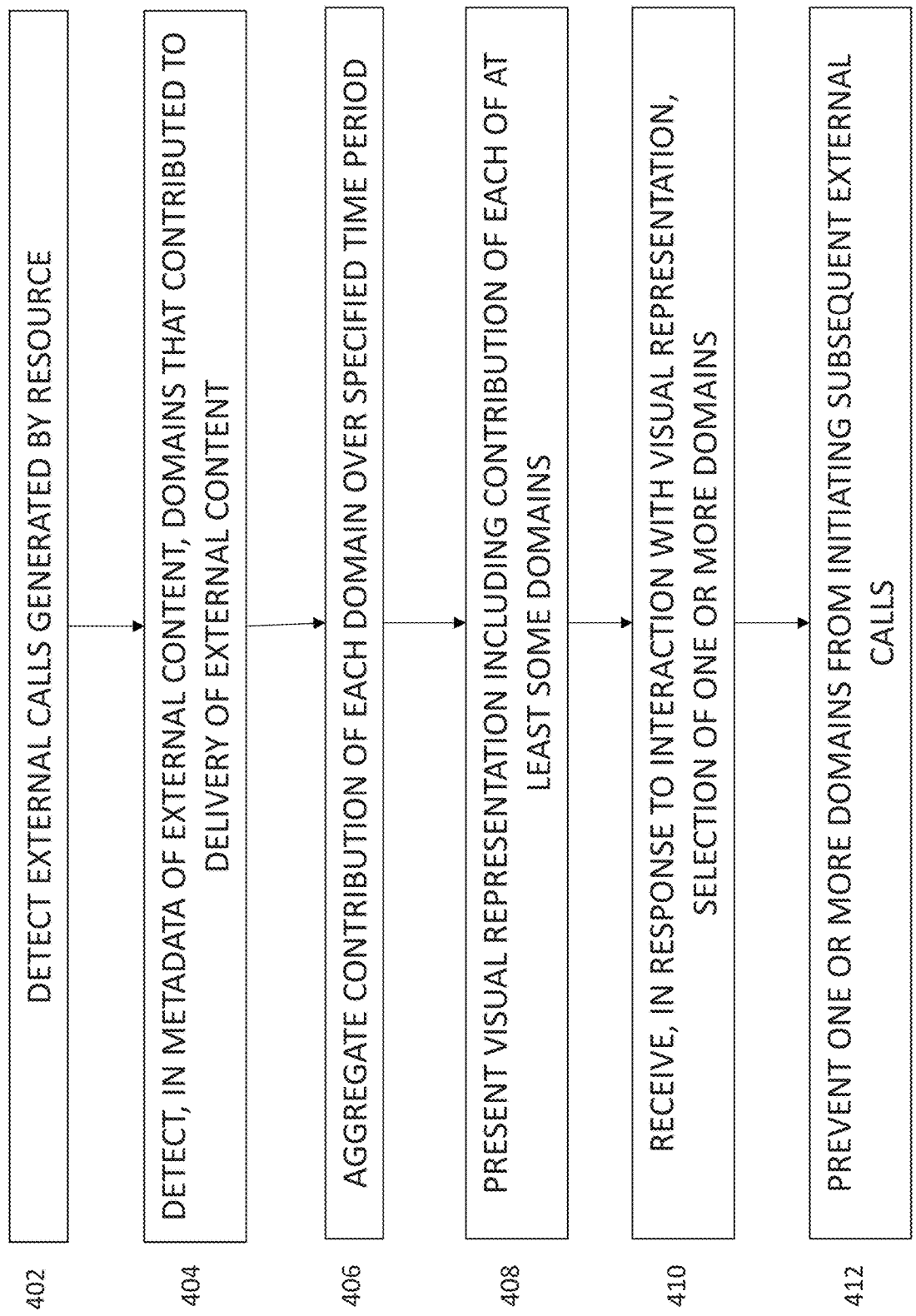
FIG. 4 illustrates a process to prevent generation and/or transmission of subsequent external calls.

FIG. 4 illustrates a process to prevent generation (by the resource 106) and/or transmission (to a domain 113) of subsequent external calls 104. The browser 110 can execute on the client device 108.

The browser 110 can detect, at 402, external calls 104 to remote servers 114. As noted above, the external calls 104 can be generated by the resource 106 by, for example, firing of one or more pixels 117 that are embedded in the resource 106. To fetch the pixel 117, the resource 106 can generate a HyperText Transfer Protocol (HTTP) request and transmit that request to the network address specified in the pixel 117. The detection of the external calls 104 by the browser 110 can include identifying each such HTTP request that is transmitted to a corresponding server 114.

In another example, the external calls 104 to remote servers 114 can occur in response to execution of a script within the resource 106 that causes the client device 108 to transmit a request to the one or more remote servers 114 to provide external content 116. In such example, the detection of the external calls 104 by the browser 110 can include identifying the execution of such script, when the script calls browser API to fetch external resources.

The remote servers 114 can respond to the external calls 104, for example, by selecting external content 116 in response to such external calls 104, and transmitting the external content 116 to the client device 108. The external content 116 can be, for example, a digital component (e.g., audio clip, video clip, image, or text in any form including the form of an advertisement) and metadata for that digital component. The metadata can indicate one or more specific domains 113 that contributed to the delivery of the external content 116. For example, the metadata can indicate that a first domain 113 contributed certain graphics in the external content 116, a second domain 113 contributed text in the external content 116, and a third domain 113 contributed other information (e.g. user demo) based on which external content 116 was selected for the external call 104. The browser 110 can detect, at 404 and based on such metadata in the external content 116, domains 113 that contributed to the delivery of the external content 116 to the client device 108.

The browser 110 can aggregate, at 406 and for each of the domains 113, a contribution of the domain 113 over a specified time period. To perform this aggregation, the browser 110 can determine, in one example, different types of external content 116 (e.g., video, audio, images, text) contributed to by the domain 113. The browser 110 can then assign a level of sub-contribution to the domain 113 for each presentation of each different type of external content. The browser 110 can subsequently aggregate the assigned levels of sub-contribution to attain the contribution 206 (shown in FIGS. 2 and 3) by the domain 113 having a domain name 204.

A visual representation 202 (or 302 in another implementation) including the contribution 206 of each of at least some of the domains 113 can be presented at 408. The visual representation 202/302 can be displayed on the client device 108 (e.g., on the browser 110) and/or the display device 120 after proper aggregation across sufficient amounts of browsers 110 to protect user privacy (e.g., on another browser, which can be different from the browser 110).

The browser 110 can receive, at 410 and in response to interaction with the visual representation 202/302, a selection of one or more domains 113 among those shown in the visual representation 202. In the implementation where the user makes a selection on the browser 110 executing on the client device 108, the browser 110 directly receives the selection input by the user on that client device 108. In this implementation, the browser 110 applies the decision on that browser globally, e.g., irrespective of the website or web page that the browser is visiting. In the implementation where the resource provider of the resource 106 makes a selection on the display device 120, the browser 110 can receive the selection from the server 111. In this implementation, the particular web page of the resource provider passes the selection to the browser 110 when the browser 110 fetches the web page of the website provided by the resource provider, and the browser 110 only applies this selection when the browser 110 renders web pages from that particular website that contains the web page.

The browser 110 can prevent, at 412, the generation (by the resource 106) and/or transmission (to the one or more selected domains 113) of subsequent external calls 104. In implementations where the external calls 104 are generated by firing of pixels 117, the resource 106 can prevent the generation of the external calls 104 by preventing such firing of the pixels 117. In the implementation where the external calls 104 are generated by the execution of a script within the resource 106, the browser 110 can prevent the generation of subsequent external calls 104 by preventing such execution of the script, or by ignoring when the script requests the browser to generate external calls 104. In an alternate implementation, the browser 110 may not intervene during the generation of the external calls 104, but may prevent transmission of subsequent external calls 104 by intercepting and stopping a transmission of those subsequent external calls 104. For example, the browser 110 can instruct a firewall on the client device 108 to identify such subsequent external calls 110 and block transmission of those subsequent external calls 110. In another alternate implementation, the browser 110 can withhold cookie(s) or other information that may help the recipient domain 113 to track the user or collect user data, but may otherwise would allow the network call to go to the recipient domain 113.

Figure 5:
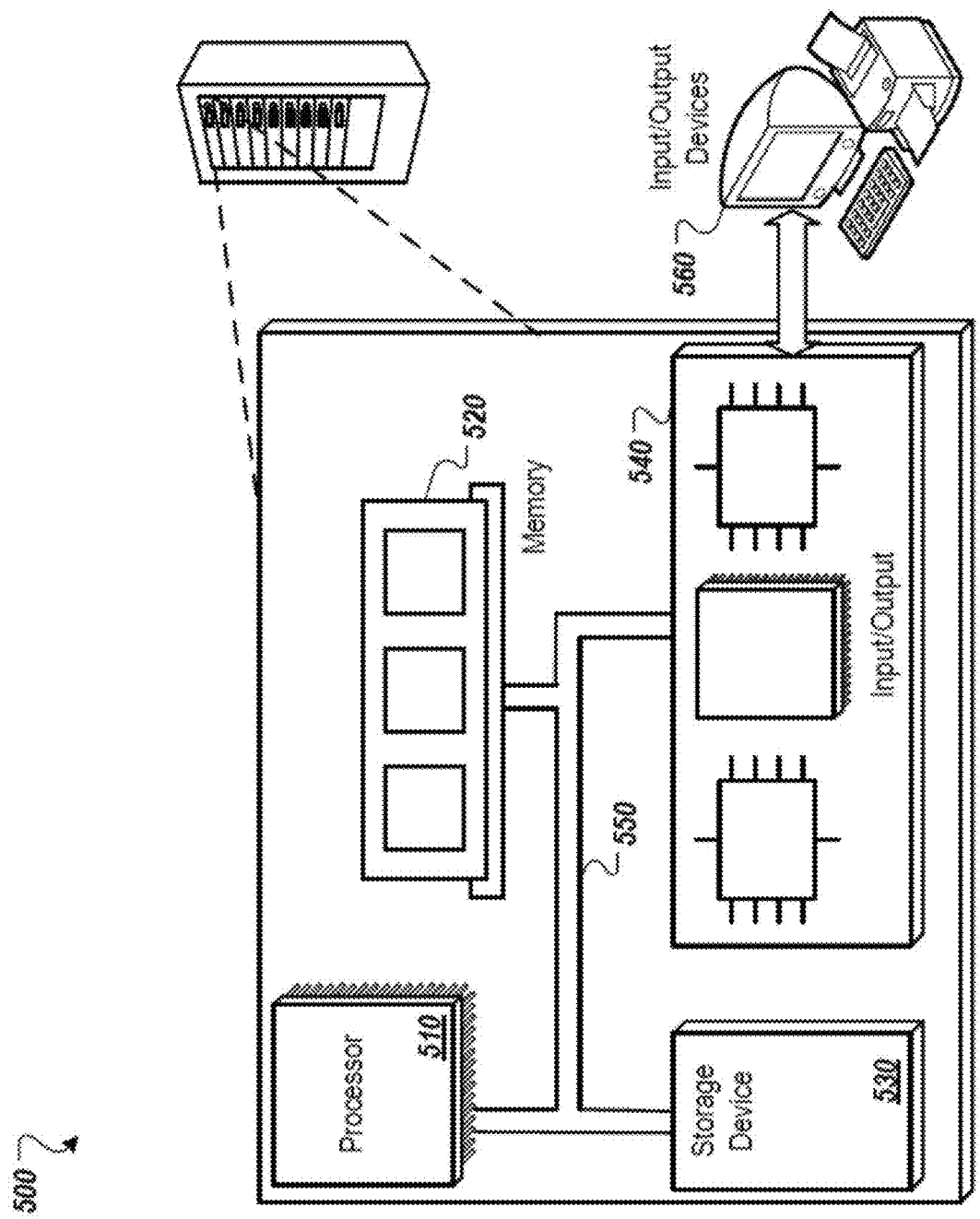
FIG. 5 is a block diagram of an example computer system that can be used to perform operations described herein.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores data within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and transmit output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal—e.g., a machine-generated electrical, optical, or electromagnetic signal—that is generated to encode data for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by transmitting documents to and receiving documents from a device that is used by the user; for example, by transmitting web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the online interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    detecting, by a browser executing on a client device, an external call to a remote server generated by an online document rendered by the browser;
    detecting, by the browser and in a given instance of external content received (i) in response to the external call and (ii) presented in the online document, metadata specifying multiple domains that contributed to delivery of the given instance of the external content presented in the online document in response to the external call;
    assigning, to each given domain among the multiple domains that contributed to delivery of the given instance of the external content, a sub-contribution level corresponding to actions of the given domain that contributed to delivery of the given instance of the external content presented in the online document in response to the external call;
    aggregating, by the browser and based on (i) the sub-contribution levels assigned to each of the multiple domains that contributed to delivery of the given instance of the external content presented in the online document in response to the external call and (ii) sub-contribution levels assigned to each of the multiple domains based on contributions assigned based on delivery of other external content to the client device, a total level of contribution of each of the given domains to delivery of external content over multiple presentations of online documents at the client device during a specified time period;
    generating and presenting, by the browser, a visual representation of (i) the total level of contribution of each of at least some of the multiple domains and (ii) a control that enables selection of one or more of the multiple domains by a user of the client device;
    receiving, by the browser and in response to interaction with the control of the visual representation presented at the browser, a selection of the one or more of the multiple domains among the at least some of the domains; and preventing, by the browser, the one or more of the multiple domains from receiving subsequent external calls from the browser in response to the selection of the one or more of the multiple domains.

2. The method of claim 1, wherein preventing the one or more domains from receiving subsequent external calls from the browser comprises preventing, by the browser, the one or more domains from receiving one or more cookies or other data that enables collection of user data by the one or more domains.

3. The method of claim 1, wherein presenting the visual representation comprises:
generating, by the browser, a recommendation that at least one of the at least some of the domains be allowed to continue tracking online interactions by way of the external calls; and
displaying, by the browser, the recommendation within the visual representation.

4. The method of claim 1, wherein the contribution of each domain of the domains is based on a total number of digital documents facilitated by the domain over the specified time period, the digital documents including a digital document associated with the external content.

5. The method of claim 4, wherein assigning the sub-contribution level comprises:
assigning a first level of contribution to external content that is video content; and
assigning a second level of contribution to external content that is still image content.

6. The method of claim 4, wherein assigning the sub-contribution level comprises assigning the sub-contribution level based on a size of the external content presented, wherein the sub-contribution level varies according to the size of the external content.

7. The method of claim 4, wherein assigning the sub-contribution level comprises assigning the sub-contribution level based on a type of online interaction performed by a user following presentation of the external content.

8. The method of claim 1, further comprising:
providing, by the browser, the total level of contribution of two or more of the domains to an application programming interface; and
receiving, by the browser and via the application programming interface, instructions from a resource provider of a resource rendered on the browser to prevent the one or more of the multiple domains from tracking user interactions.

9. A non-transitory computer program product storing instructions that, when executed by a browser executing on a client device, cause the browser to perform operations comprising:
detecting an external call to a remote server generated by an online document rendered by the browser,
detecting, in a given instance of external content received (i) in response to the external call and (ii) presented in the online document, metadata specifying multiple domains that contributed to delivery of the given instance of the external content presented in the online document in response to the external call;
assigning, to each given domain among the multiple domains that contributed to delivery of the given instance of the external content, a sub-contribution level corresponding to actions of the given domain that contributed to delivery of the given instance of the external content presented in the online document in response to the external call;
aggregating, based on (i) the sub-contribution levels assigned to each of the multiple domains that contributed to delivery of the given instance of the external content presented in the online document in response to the external call and (ii) sub-contribution levels assigned to each of the multiple domains based on contributions assigned based on delivery of other external content to the client device, a total level of contribution of each of the given domains to delivery of external content over multiple presentations of online documents at the client device during a specified time period;
presenting a visual representation of (i) the total level of contribution of each of at least some of the multiple domains and (ii) a control that enables selection of one or more of the multiple domains by a user of the client device;
receiving, in response to interaction with the control of the visual representation presented at the browser, a selection of the one or more of the multiple domains among the at least some of the domains; and
preventing the one or more of the multiple domains from receiving subsequent external calls from the browser in response to the selection of the one or more of the multiple domains.

10. The non-transitory computer program product of claim 9, wherein preventing the one or more domains from receiving subsequent external calls from the browser comprises preventing the one or more domains from receiving one or more cookies or other data that enables collection of user data by the one or more domains.

11. The non-transitory computer program product of claim 9, wherein presenting the visual representation comprises:
generating, by the browser, a recommendation that at least one of the at least some of the domains be allowed to continue tracking online interactions by way of the external calls; and
displaying, by the browser, the recommendation within the visual representation.

12. The non-transitory computer program product of claim 9, wherein the contribution of each domain of the domains is based on a total number of digital documents facilitated by the domain over the specified time period, the digital documents including a digital document associated with the external content.

13. The non-transitory computer program product of claim 12, wherein assigning the sub-contribution level comprises:
assigning a first level of contribution to external content that is video content; and
assigning a second level of contribution to external content that is still image content.

14. The non-transitory computer program product of claim 12, wherein assigning the sub-contribution level comprises assigning the sub-contribution level based on a size of the external content presented, wherein the sub-contribution level varies according to the size of the external content.

15. The non-transitory computer program product of claim 12, wherein assigning the sub-contribution level comprises assigning the sub-contribution level based on a type of online interaction performed by a user following presentation of the external content.

16. The non-transitory computer program product of claim 9, wherein the operations further comprise:
    providing, by the browser, the total level of contribution of two or more of the domains to an application programming interface; and
    receiving, by the browser and via the application programming interface, instructions from a resource provider of a resource rendered on the browser to prevent the one or more of the multiple domains from tracking user interactions.

17. A system comprising:
one or more data processing devices; and
a machine-readable medium storing instructions that, when executed by the one or more data processing devices, cause the one or more data processing devices to perform operations comprising:
    detecting an external call to a remote server generated by an online document rendered by the browser;
    detecting, in a given instance of external content received (i) in response to the external call and (ii) presented in the online document, metadata specifying multiple domains that contributed to delivery of the given instance of the external content presented in the online document in response to the external call;
    assigning, to each given domain among the multiple domains that contributed to delivery of the given instance of the external content, a sub-contribution level corresponding to actions of the given domain that contributed to delivery of the given instance of the external content presented in the online document in response to the external call;
    aggregating, based on (i) the sub-contribution levels assigned to each of the multiple domains that contributed to delivery of the given instance of the external content presented in the online document in response to the external call and (ii) sub-contribution levels assigned to each of the multiple domains based on contributions assigned based on delivery of other external content to the client device, a total level of contribution of each of the given domains to delivery of external content over multiple presentations of online documents at the client device during a specified time period;
    presenting a visual representation of (i) the total level of contribution of each of at least some of the multiple domains and (ii) a control that enables selection of one or more of the multiple domains by a user of the client device;
    receiving, in response to interaction with the control of the visual representation presented at the browser, a selection of the one or more of the multiple domains among the at least some of the domains; and
    preventing the one or more of the multiple domains from receiving subsequent external calls from the browser in response to the selection of the one or more of the multiple domains.

* * * * *